United States Patent [19]

Jain

[11] Patent Number: 5,563,740
[45] Date of Patent: Oct. 8, 1996

[54] DEVICE FOR TRUING THE ROUNDNESS OF CAMERA LENSES AND METHOD OF USE THEREFOR

[76] Inventor: Vipin Jain, 240 E. Wilbur Rd. #B, Thousand Oaks, Calif. 91360

[21] Appl. No.: 262,019

[22] Filed: Jun. 17, 1994

[51] Int. Cl.6 .................................................. G02B 7/02
[52] U.S. Cl. ...................... 359/818; 359/813; 359/822; 248/316.4; 248/316.6; 248/313
[58] Field of Search ................................... 359/818, 819, 359/822, 813, 808; 248/904, 316.4, 316.6, 316.8, 313, 231.4, 231.6, 225.31; 354/286

[56] References Cited

U.S. PATENT DOCUMENTS

| | | | |
|---|---|---|---|
| 3,652,152 | 3/1972 | Thursby, Jr. | 359/822 |
| 4,103,852 | 8/1978 | First | 248/316.8 |
| 4,586,221 | 5/1986 | Wu | 248/904 |
| 4,632,352 | 12/1986 | Stoll | 248/313 |
| 4,927,237 | 5/1990 | Hart | 359/819 |

*Primary Examiner*—Loha Ben
*Attorney, Agent, or Firm*—Michael J. Tavella

[57] ABSTRACT

A vise like device that has a pair of oppositely disposed jaws is disclosed. This vise is used to true the roundness of camera lenses. The jaws form arcs of a circle that corresponds to the size of the lens being repaired. The jaws are threaded to protect the threads on the frame. Once the lens frame is secure on the jaws, the vise is slowly opened, pulling the frame around the jaws until the correct diameter is reached and the frame is round. This procedure saves time because the frame becomes true automatically as the vise is opened. Thus, there is no need to continuously check the roundness against a standard as the process continues. Moreover, this process is more forgiving because the frame is gradually and gently trued up. This gradual process also eliminates the need to remove any over correction to the lens shape. Finally, once the lens had be trued, filters and other accessories can again be attached to the lens.

9 Claims, 1 Drawing Sheet

DEVICE FOR TRUING THE ROUNDNESS OF CAMERA LENSES AND METHOD OF USE THEREFOR

This invention relates to devices and methods for truing the roundness of camera lenses and more particularly to devices and methods for truing the roundness of camera lenses that use a vise jaw system to correct the roundness.

BACKGROUND OF THE INVENTION

Camera lenses are fragile items. Lenses have a ground optical glass that is surrounded by a thin metal frame. If the lens is damaged this frame is often bent out of round. Typically, the frame is dented inwardly. To correct this problem, it is necessary to bring this frame back into round. Although many ways exist to do this, it can be difficult and time consuming to ensure that the frame is truly round. A frequent method of truing the frame is to bend the frame by hand and then compare it to a standard. This trial-and-error bending and testing is an imprecise, time consuming process that is practicably unworkable.

SUMMARY OF THE INVENTION

The present invention overcomes these difficulties. It is a vise-like device that has a pair of oppositely disposed jaws. The jaws are arcs of a circle that corresponds to the size of the lens being repaired. The jaws are threaded to protect the threads on the frame from being damaged during the repair process. Once the frame is secure on the jaws, the vise is slowly opened. As it is opened, it pulls the frame around the jaws until the correct diameter is reached and the frame is round. This procedure saves time because the frame becomes true automatically as the vise is opened. Thus, there is no need to continuously check the roundness against a standard as the process continues. Moreover, this process is more forgiving because the frame is gradually and gently trued up. This gradual process also eliminates the need to remove any over correction to the lens shape. Finally, once the lens had been trued, filters and other accessories can again be attached to the lens.

DETAILED DESCRIPTION OF THE INVENTION

Figure 1:
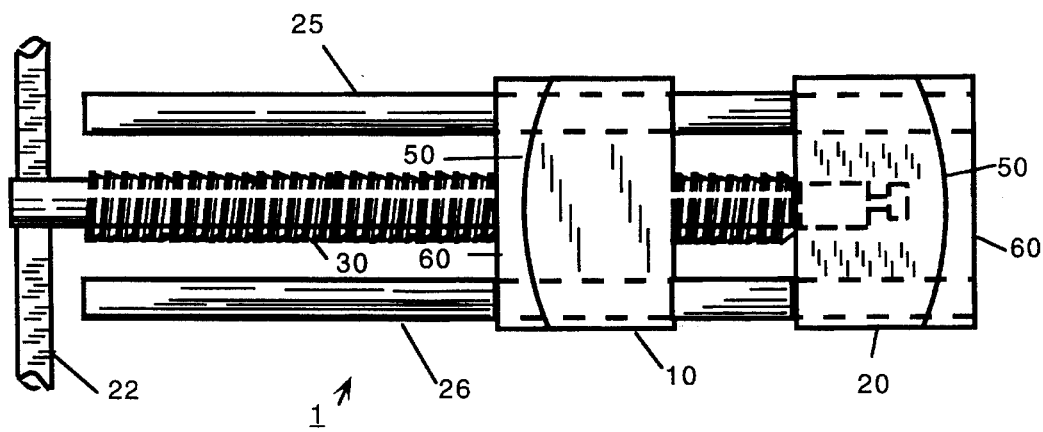
FIG. 1 is a top view of the preferred embodiment.
Figure 2:
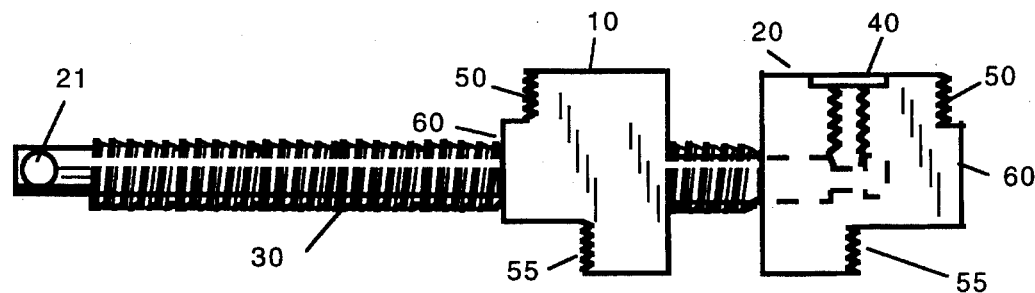
FIG. 2 is a side view of the preferred embodiment.

Referring now to the drawings, and more particularly, FIGS. 1 and 2, the lens vise 1 has two oppositely disposed jaws. These jaws are designed to operate in a flat plane. A movable jaw 10 and a fixed jaw 20. Movable jaw 10 rides on support dowels 25 and 26. The support dowels 25 and 26 are secured to jaw 20. A screw drive 30 passes through jaw 10. Jaw 10 is threaded through its center to accommodate the screw drive 30. The screw drive 30 passes into jaw 20 where it is anchored by set screw 40 (see FIG. 2). This forms a standard vise mechanism where the support dowels 25 and 26 prevent jaw 10 from turning as the screw drive is turned. A handle 22 is attached to the opposite end of the screw drive 30. The handle 22 passes through a hole 21 in the screw drive 30 as shown. The handle 22 allows the user to turn the screw drive 30 to operate the device. When this happens, jaw 10 is forced inward or outward depending on the direction of rotation of the screw drive. Unlike most ordinary vices that are used to hold items by compression between the jaws, this device works by pulling the jaws apart.

Figure 3:
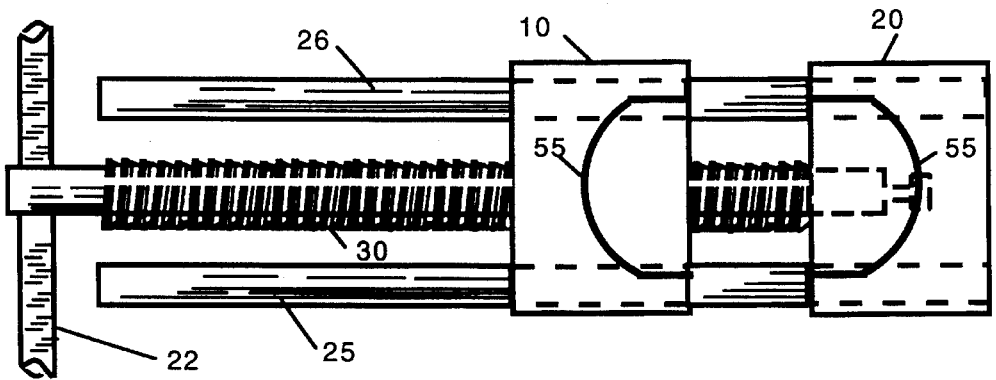
FIG. 3 is a bottom view of the preferred embodiment.

A lens (not shown) is secured onto the threads 50 cut on the lens supports 60. Two sets of lens supports are provided. FIG. 1 shows the larger diameter. In the preferred embodiment, this larger diameter is 36 millimeters when the lens supports are fully closed. FIG. 3 shows the underside of the vise, having a set of supports 55 for smaller lenses. In the preferred embodiment, the smaller diameter is 20 millimeters when the lens supports are fully closed. Although the spacing of the jaws is critical for a particular type of lens, the jaws and supports can be designed to whatever size is needed.

The out of round lens is secured onto either the lens supports 60 or 55. Once in place, the jaws can then be slowly opened pulling the lens closer and closer to true roundness. Once the lens is again true, the vice can be simply loosened and the lens removed from the vise, ready for use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A device to true up camera lens frames being out of round, comprising:
    a) two oppositely disposed jaws, a first jaw being fixed in position, and a second jaw being movable with respect to said first jaw in a flat plane;
    b) means for moving said second jaw in relation to said first jaw;
    c) means for supporting a camera lens frame, having a pair of oppositely disposed semi-annular blocks, being formed on said first and second jaws; and
    d) means for restraining said camera lens frame on said means for supporting said camera lens frame.

2. The device to true up camera lens frames of claim 1 wherein said pair of oppositely disposed semi-annular blocks are threaded.

3. The device to true up camera lens frames of claim 1 wherein said pair of oppositely disposed semi-annular blocks have a diameter of 36 millimeters when said first and second jaws are fully closed.

4. The device to true up camera lens frames of claim 1 wherein said pair of oppositely disposed semi-annular blocks have a diameter of 20 millimeters when said first and second jaws are fully closed.

5. A device to true up camera lens frames being out of round, comprising:
    a) two oppositely disposed jaws, a first jaw being fixed in position, and a second jaw being movable with respect to said first jaw in a flat plane said first and second jaws each having a top and a bottom surface;
    b) means for moving said second jaw in relation to said first jaw;
    c) a first pair of oppositely disposed semi-annular blocks fixedly installed on the top of said first and second jaws;
    d) a second pair of oppositely disposed semi-annular blocks fixedly installed on the bottom surface of said first and second jaws;

e) means for restraining a camera lens frame on said first pair of oppositely disposed semi-annular blocks; and f) means for restraining said camera lens frame on said second pair of oppositely disposed semi-annular blocks.

6. The device to true up camera lens frames of claim 5 wherein said means for restraining said camera lens frame on said first and second pair of oppositely disposed semi-annular blocks comprise threads formed on said first and second pair of semi-annular blocks.

7. The device to true up camera lens frames of claim 5 wherein said first pair of oppositely disposed semi-annular blocks has a diameter of 36 millimeters when said first and second jaws are fully closed.

8. The device to true up camera lens frames of claim 5 wherein said second pair of oppositely disposed semi-annular blocks has a diameter of 20 millimeters when said first and second jaws are fully closed.

9. A method of trueing up camera lens frames being out of round, comprising the steps of:

a) placing a camera lens frame on a pair of jaws of a vise having annular lens frame supports that correspond to the diameter of said camera lens frame;

b) opening said pair of vise jaws until the camera lens frame has reached a true roundness;

c) closing said pair of vise jaws to release pressure on the camera lens frame; and d) removing the camera lens frame from the pair of vise jaws.

* * * * *